Jan. 5, 1971  G. H. DAVIS  3,551,980
METHOD FOR ASSEMBLING VANE AND ABUTMENT SEALS IN
ROTARY ACTUATORS AND THE LIKE
Original Filed March 16, 1966  3 Sheets-Sheet 1
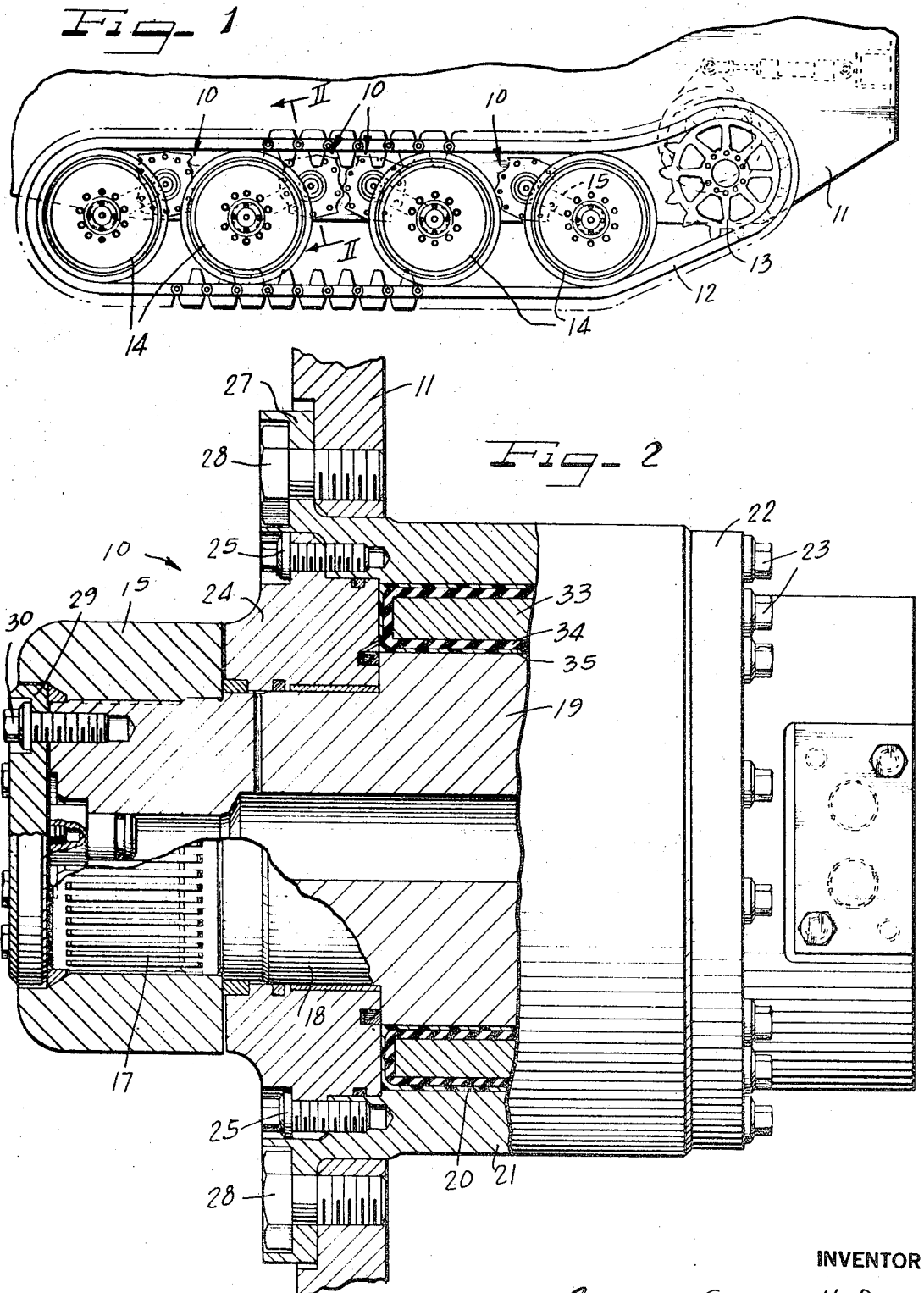
INVENTOR
GEORGE H. DAVIS
ATTORNEY

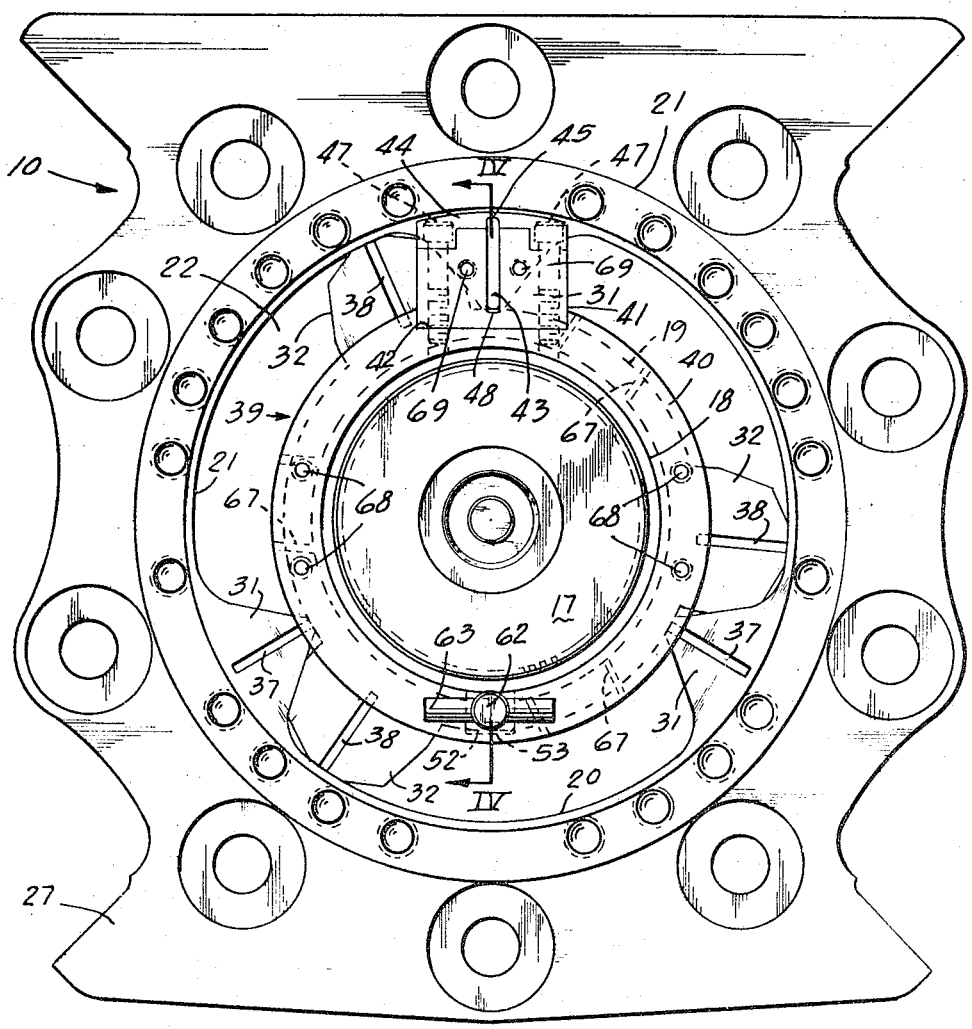

INVENTOR
GEORGE H. DAVIS

ATTORNEY

United States Patent Office 3,551,980
Patented Jan. 5, 1971

3,551,980
METHOD FOR ASSEMBLING VANE AND ABUTMENT SEALS IN ROTARY ACTUATORS AND THE LIKE
George H. Davis, Tonawanda, N.Y., assignor to Houdaille Industries, Inc., Buffalo, N.Y., a corporation of Delaware
Original application Mar. 16, 1966, Ser. No. 534,707, now Patent No. 3,447,226, dated June 3, 1969. Divided and this application Sept. 3, 1968, Ser. No. 810,402
Int. Cl. B21k 19/00; B23p 11/00
U.S. Cl. 29—148.3    7 Claims

ABSTRACT OF THE DISCLOSURE

A method of assembling seals in slotted abutment and wing shaft vanes of a rotary actuator while the wing shaft is in assembled relation within the actuator housing, comprising applying about the journalled portion of the wing shaft the collar of a seal-assembling tool which includes a seal guiding slot, orienting the collar to align the seal guiding slot with a seal slot in any selected one of the abutments or vanes, accurately matching the exit end of the guide slot with the entry end of the selected seal slot, and thrusting a seal assembly through the guide slot into the seal slot.

---

This application is a division of my application Ser. No. 534,707, filed Mar. 16, 1966, now Pat. No. 3,447,226.

This invention relates to assembling seals into slotted members, and more particularly concerns a novel method for assembling vane and abutment seals in rotary actuators and the like.

Rotary fluid pressure devices of the type which are adapted for use as actuators, fluid motors, vibration and shimmy dampers, or combining the functions of such devices, have one or more abutments in a cylindrical working chamber, cooperating with a like number of vanes on a relatively oscillatable wing shaft to subdivide the working chamber into subchambers wherein pressure fluid determines relative angular positions of the wing shaft and the housing of the device. Hereinafter, all such devices will be referred to in a general sense as actuators.

In order to control closely, and most generally to preclude as near as practicable any leakage between the working chambers under the differential pressure conditions therein at the respective opposite sides of the abutments and vanes, respective seals are provided between the edges of the abutments and the edges of the wing shaft vanes and the opposing surfaces of the assembly. One practical and commercially advantageous form of such vanes is that covered in U.S. Pat. 3,021,822, dated Feb. 20, 1962, and assigned to the same assignee as the present application. According to that arrangement, both the abutments and vanes are slotted to open at their tips and opposite ends. Within the slots are mounted seals, each comprising a relatively rigid spacer plate or block about the edge of which is engaged an elastomeric pressurizing O-ring, and about which is engaged a seal ring of plastic material made of a so-called self-lubricating material of which polytetrafluoroethylene and nylon are examples. In view of the necessary compression/expansion relationship of the O-ring to the seal ring, there is initially an uncompressed condition wherein the overall dimension of the assembly in the plane of the receiving slot is greater than the depth and length of the slot. In the operative assembly of the wing shaft and the housing of the actuator, the seals are compressed into the slot and thereby thrust effectively into sealing engagement with the respectively opposing surfaces past which fluid escape is to be prevented.

Assembly of the seals into their respective slots presents no problem before the wing shaft and the housing of the actuator are assembled together. However, since the seals initially and in the uncompressed condition protrude from the slots, it is necessary to utilize some means for either precompressing the seals or in same way camming or otherwise effecting compressive displacement of the seals into the slots as the wing shaft and housing members are assembled together, in order to avoid shearing or gouging the seal ring. If the seal ring is not perfectly square against the opposing surface to be sealed, it is ineffective. In factory production, cam-in fixtures have been utilized. Sometimes shimming has been employed. But these are cumbersome devices and expedients, and are not satisfactory for field repair use or servicing of actuators. In respect to actuators used in the suspension systems of endless track vehicles, it has heretofore been necessary to remove the actuators in order to effect seal replacements. For this purpose it has been necessary to place the vehicles on blocks, disconnect hydraulic connections, remove all operating members such as road arms from the actuators, and then detach the actuators from the hull or vehicle frame and place the actuators on a workbench fixture. On some vehicles it is even necessary to remove the engine and other major components to gain access to the actuators of the suspension.

According to the present invention, it is an important object to provide a novel method which greatly facilitates assembling vane and abutment seals in rotary actuators, and more particularly permits such assembling without removal of the actuators from utility installation such as in the suspensions of the road gear of endless track vehicles.

Another object of the invention is to provide a new method especially useful in conveniently and easily assemblying the seals in vanes and abutments of rotary actuators while the wing shafts and housings are in fully assembled relation.

A further object is to provide a new method of assembling seals in rotary actuator vanes and abutments.

Other objects, features and advantages of the present invention will be readily apparent from the following detailed description of a preferred embodiment thereof taken in conjunction with the accompanying drawings, in which:

FIG. 1 is a fragmentary side elevational view of an endless track vehicle running gear employing rotary actuators subject to servicing by means of the tool of the present invention;

FIG. 2 is an enlarged fragmentary sectional and elevational detail view of one of the rotary actuators taken substantially on the line II—II of FIG. 1;

FIG. 3 is an end elevational view of the actuator showing a tool adapted to practice the method of the present invention applied thereto;

Figure 4:
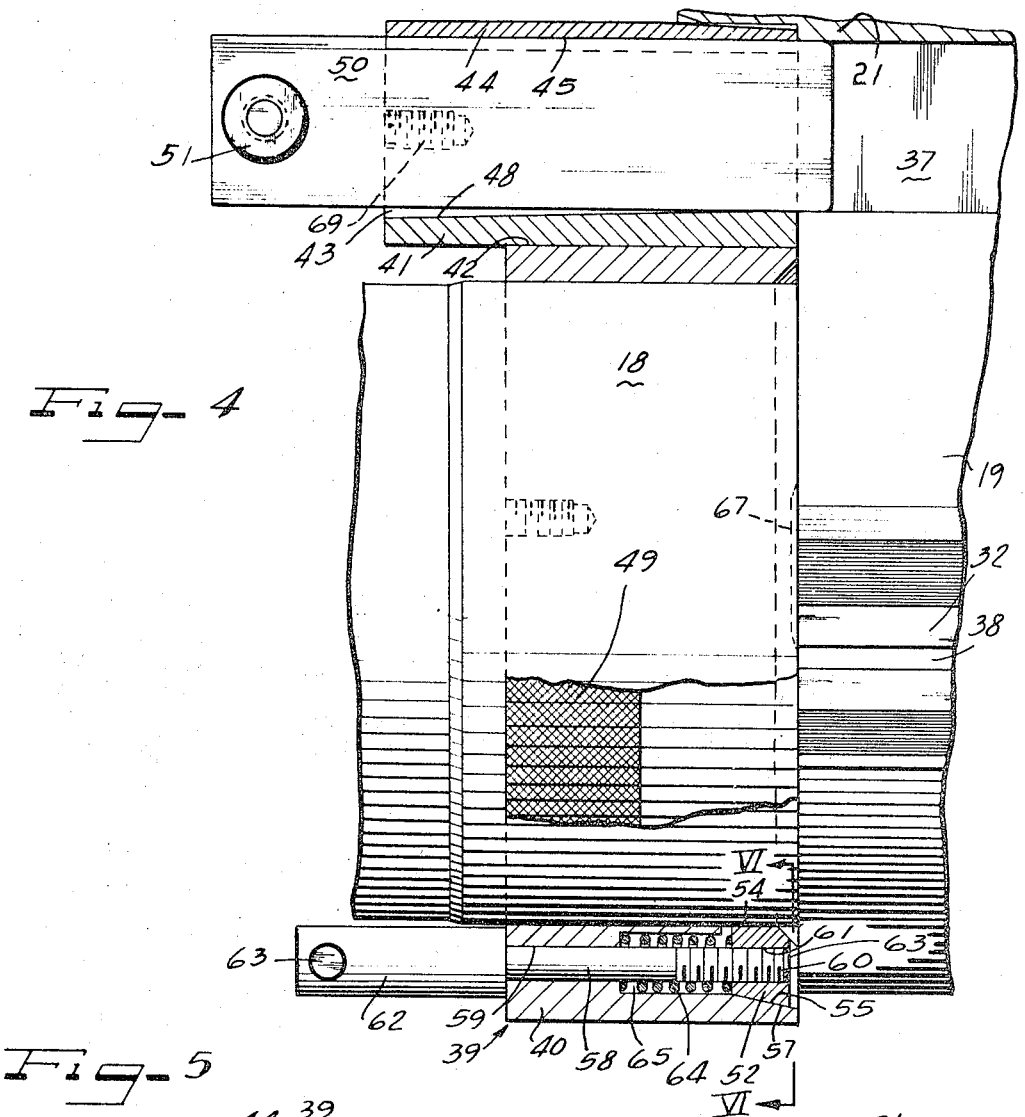
FIG. 4 is an enlarged diametrical sectional view taken substantially on the line IV—IV of FIG. 3.
Figure 5:
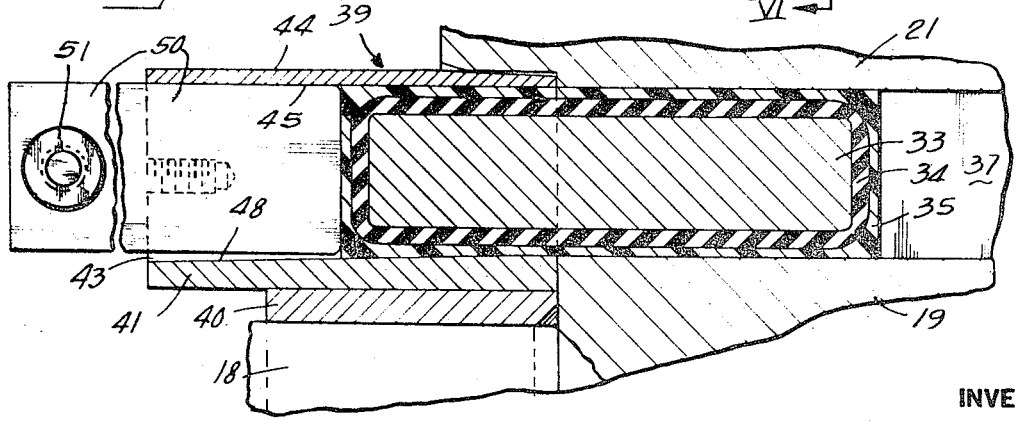
FIG. 5 is a fragmentary sectional view similar to FIG.

4 but showing the manner in which a seal is assembled according to the present method; and FIG. 6 is a fragmentary end elevational view of a portion of the tool taken substantially along the line VI—VI of FIG. 4.

As an example of rotary actuators 10 (FIGS. 1, 2 and 3) with which the present invention is especially useful, are a type which are successfully employed in the running gear suspensions of endless track vehicles. Such a vehicle includes a frame or hull 11, a pair of like articulated endless tracks 12 driven by a toothed driving wheel and running over and under a set of road wheels 14, each of which is mounted on an axle carried by a road arm 15 operatively connected to one of the actuators 10.

For connection to the associated actuator 10, each of the road arms 15 has a splined eye head end portion which is engaged corotatively on a splined forward end terminal portion 17 of a front journal part 18 on a wing shaft 19 which is coaxially mounted within a generally cylindrical working chamber 20 provided by a tubular housing 21. A rear end closure for the chamber 20 and bearing for the rear end journal of the wing shaft 19 is provided by a closure member 22 secured as by means of screws 23 to the rear end of the housing 21. At its front end, the working chamber 20 is enclosed by a front end closure and wing shaft bearing member 24 secured as by means of screws 25 to the front end of the housing 21. Attachment of the actuator to the vehicle hull frame 11 is by means of a lateral attachment flange 27 integral with the front end portion of the housing body 21 and screws 28 which secure the flange to the frame. A retaining plate disk 29 attached to the outer end of the shaft terminal 17 by screws 30 holds the shaft-engaging end of the road arm against unintentional displacement from the shaft.

Within the working chamber 20 stationary abutment means comprising, in this instance, three equally spaced abutments 31 project radially inwardly and at their tips slidably engage or at least closely oppose the cylindrical perimeter of the wing shaft 19. Intermediate the abutments an equal number of radially outwardly projecting vanes 32 on the wing shaft 19 slidably engage or at least closely oppose the cylindrical wall defining the working chamber 20. At their opposite ends both the abutments 31 and the vanes 32 slidably engage or at least closely oppose respectively the end closure member 22 and the end closure member 24. Thereby the working chamber 20 is subdivided into a plurality of subchambers, and relative oscillation of the wing shaft 19 within the housing 21 is adapted to be effected by means of differential hydraulic pressure acting on the vanes 32, in well known manner. Connection of the actuator 10 in a hydraulic control circuit is adapted to be effected through the rear closure 22.

In order to at least minimize leakage of hydraulic pressure fluid past the abutments 31 and the vanes 32, seals are provided which are identical for both the abutments 31 and the vanes 32. Each of the seals comprises a relatively rigid core plate 33 about the edge boundary of which is engaged an elastomeric O-ring 34 having engaged about the perimeter defined thereby a sealing ring 35 of a low friction, substantially self-lubricating plastic material such as polytetrafluoroethylene or nylon. This seal is retained within a respective radial slot 37 in the abutments and a respective radial slot 38 in the vanes, such slots opening toward the opposed cylindrical surface and toward the opposed surfaces of the respective end closure members. The construction and relative dimensions of the seal assembly components are such that the O-rings 34 provide uniform resilient expansile outward thrust against the associated seal rings 35 whereby to maintain them in firm, square dynamic sealing engagement with the opposed surfaces of the relatively movable members of the actuator.

According to the present invention assembly of the seals in the respective slots 37 and 38 is greatly simplified and facilitated by employing the method of the present invention and which may be practiced by means of a novel assembling tool 39 (FIGS. 3–6) which enables effecting seal assembly while the wing shaft 19 and the housing 21 are in fully assembled relation. To this end, the tool comprises a unitary assembly including a body ring 40 having its inside diameter dimensioned for free sliding fit into position about the journal portion 18 of the wing shaft and to rest against the wing shaft body over the root end portions of the vanes 32. On the tool body is a seal guide 41 which may be formed integrally in one piece therewith, but conveniently comprises a block set into a complementary radially outwardly opening mounting slot groove 42 in the perimeter of the tool body and extending throughout its length on its inner end face, the guide block 41 is flush with the inner face of the body ring 40. Extending longitudinally through the guide block 41 is a seal guide slot 43 dimensioned to receive a seal assembly to guide the seal assembly into any selected one of the seal slots 37 and 38. For convenience in shaping the guide slot, the radially outer side of the guide block 41 is formed as a separate portion or member 44 having a complementary radially outer edge portion 45 of the seal guide slot and secured fixedly to the block 41 as by means of screws 47 which also secure the block to the body ring 40. While the radially outer slot portion 45 is desirably axially straight and located for accurate alignment with the radially outer boundary of the respective actuator seal slots, the main guide slot 43 has its radially inner bounding surface provided with a lead-in taper 48 extending from an outer flaring end to the inner end of the guide slot which is located to be aligned accurately with the radially inner surface defining any one of the respective vane slots 37 or 38.

In order to align the guide slot 43 accurately with the selected vane slot, the tool 39 is freely turningly oriented on the journal 18 until the slot 43 is generally aligned with the selected seal slot, such turning movement of the tool body ring 40 being facilitated by providing its outer perimeter with an annular band of knurling 49 to facilitate non-slip grasping thereof. Then an elongated plunger 50 of cross sectional shape complementary to, but of substantially greater length than the guide slot 43 is introduced through the outer end of the slot until the inner end portion of the plunger enters the selected seal slot and thereby completes accurate alignment of the guide slot with the seal slot. At its opposite end portion, the plunger 50 has a handle 51.

While the plunger 50 is still in its slot orienting position, the tool 39 is locked firmly against either turning or axial displacement relative to the wing shaft 19. This is conveniently effected by means of a locking wedge (FIG. 4) which is mounted in a complementary recess 53 (FIG. 6) opening inwardly and rearwardly in the body ring 40, preferably diametrically opposite the seal guide 41. On the wedge 52 is a radially inwardly facing locking surface 54 which is complementary to and lockingly engageable with the wing shaft journal portion 18. Opposing the locking wedge 52 within the recess 53 is a generally radially inwardly and axially rearwardly facing cam surface 55 which opposes a complementary wedging cam surface 57 on the wedge member, so that by drawing the wedge member into the recess 53 it will be cammingly thrust radially inwardly into wedging locking engagement with the journal portion 18 and frictionally lock the ring 40 rigidly onto the journal portion 18 and against either turning or axial displacement. Means for actuating the locking wedge 52 conveniently comprise a rotary screw shaft 58 extending freely through a bore 59 in the ring 40 aligned with the recess 53 and having a threaded inner end portion 60 which threadedly engages in a complementary bore 61 in the wedge member. On its outer end portion the wedge-actuating shaft is provided with a larger diameter shouldering portion 62 having on its outer end portion a handle 63 and at its inner end shouldering against the outer end face of the body ring 40. Thereby, by turning the shaft 58 to draw up the locking wedge 52, the tool is locked in position. By reversing the shaft the locking wedge is adapted to be released by inward thrusting pressure exerted through the actuating shaft. Desirably, unlocking movement of the wedge 52 is facilitated by a coiled biasing spring 64 accommodated within a counterbore 65 opening into the wedge recess 53 to accommodate the spring 64 about the shaft 58 with one end of the spring thrusting against the wedge 52 under compression and the opposite end seated in the base end of the counterbore.

After the tool 39 has been locked with the guide slot 43 aligned with the selected seal slot, such as one of the seal slots 37, the plunger 50 is withdrawn to clear the guide throat provided by the slot 43 and one of the seal assemblies is introduced into the guide throat as far as it can conveniently be pushed manually. As the seal assembly moves inwardly into the guide throat it is maintained at its sides against spreading beyond the width of the seal slot into which it is to be introduced. As the seal assembly progresses down the guide throat of the tool, the lead-in cam surface 48 and the opposed longitudinal surface 45 gradually and progressively compress the seal ring 35 and the pressurizing O-ring 34 along the longitudinal edges of the seal assembly until at the leading end of the seal the compressed dimensions accurately match the entrance into the selected seal slot. Entry of the seal into the seal slot and continuing movement thereinto by continued inward pressure on the seal assembly is thus effected without damaging encounter with any edges defining the entrance into the seal slot. By lubricating the surfaces within the guide slot and the seal slot with oil such as the hydraulic fluid used in operation of the hydraulic actuator, the assembly operation is facilitated. When the outer end of the seal assembly reaches the entry or mouth end of the guide slot 43, or before, the plunger 50 is applied to the seal assembly to thrust it all the way home down the guide slot and into the seal slot. Thereafter the tool 39 is unlocked and rotated to the next seal slot to be filled and the process is repeated, until seal assemblies have been loaded into all of the seal slots.

Although the tool 39 is mounted on the wing shaft, no difficulty is experienced in accurately guiding seal assemblies into the abutment slots 37, because the wing shaft and the housing are free to be rotated until the abutments and vanes are in side-by-side contact, as shown in FIG. 3. Then by effecting alignment of the guide slot of the tool with the desired abutment seal slot, in the manner described, assembly of a seal therein is just as readily accomplished as adapted to be effected in respect to the seal slots 38 in the vanes.

Inasmuch as the seal assemblies are without compression in the axial direction of the actuator after being assembled within the seal slot and until the missing end closure member is secured in place, the ends of the seal assemblies at the exposed ends of the abutments and vanes will project a limited distance from such ends after the assemblies have been thrust as far as may be effected into the slot by the plunger 50. Therefore, it is generally desirable to insert the seal assemblies first into all of the abutment seal slots 37 and thereafter into the vane seal slots 38. While the seals are being inserted into the vane seal slots 38, suitable shallow clearance grooves 67 of sufficient width and extending radially across the inner or back end edge of the tool body collar 40 are adapted to be aligned with the respective abutments 31 to clear the ends of the seal assemblies projecting therefrom.

Provisions are made for adding a handle to the tool 39 if desired. For this purpose pairs of screw holes 68 are provided to open from diametrically opposite sides through the outer end face of the tool collar 40. Thereby, if desired a handle can be easily attached to the tool. Further, in order to adapt the tool for assembling longer seal assemblies, an extension of the seal guide 41 may be applied to its outer ends to afford a supplementary length to the guide slot 43. For this purpose a pair of outwardly opening screw holes 69 are provided in the body block of the seal guide.

The present tool is especially adapted for field service use, although it may, of course, be employed as well for bench assembly purposes. In the field, when it is desired to replace the actuator seals, removal of the screws 30 and then the plate 29 from the end of the actuator terminal 17 and then removal of the road arm 15 enables removal of the end closure member 24 by removal of the retaining screws 25. Then the wing shaft 19 can be pulled out of the actuator housing, the old seals removed from the vanes and abutments, as well as any other seals that may desirably be replaced. The wing shaft is then returned into the housing, the tool 39 applied thereto, the several abutment and vane seals inserted, and the actuator is ready to be closed again by replacing the end cover 24, whereafter the road arm 15 and the retaining plate 29 are adapted to be replaced. All this can be accomplished without removal of the actuator from the vehicle frame 11. If for any reason it would be more convenient to assemble the seals through the inner or rear end of the actuator, that may be effected wilth the end closure 22 removed.

It will be understood that modifications and variations may be effected without departing from the scope of the novel concepts of the present invention.

I claim:

1. A method of assembling seals in slotted abutments and wing shaft vanes of a rotary actuator while the wing shaft is in assembled relation within the actuator housing, and the wing shaft having a journal portion, comprising the steps of:
 applying about the journal portion the collar of a seal-assembling tool which includes a slotted seal guide;
 orienting said collar to align the seal guiding slot with a seal slot in any selected one of the abutments or vanes;
 accurately matching the exit end of the guide slot with the entry end of the selected seal slot;
 and thrusting a seal through the guide slot into the seal slot.

2. The method of claim 1, in which said matching is effected by thrusting a plunger having substantially the same cross sectional dimensions as the cross sectional dimensions of the seal slots through said guide slot into the selected seal slot, while the plunger is in its slot end matching position locking the collar against displacement relative to the journal portion, withdrawing the plunger from the slots, inserting the seal assembly into the guide slot and thrusting it partially into the seal slot, and engaging the outer end of the seal with said plunger and continuing thrusting of the seal into the seal slot until the seal is fully loaded into the seal slot.

3. The method of claim 1, including initially relatively rotatably positioning the wing shaft in the actuator housing until the vanes and abutments are in side-by-side engagement, and then inserting the seal into one of the abutment slots.

4. A method according to claim 1, comprising compressing the seal to enter the selected seal slot free from damaging encounter with edges defining the entrance into the seal slot.

5. A method according to claim 2, comprising compressing the seal to enter the selected seal slot free from damaging encounter with edges defining the entrance into the seal slot.

6. A method according to claim 3, comprising compressing the seal to enter the selected seal slot free from damaging encounter with edges defining the entrance into the seal slot.

7. A method according to claim 1, in which said orienting of the collar to align the seal guiding slot with a seal slot is effected by turning the collar on said journal portion until alignment has been accomplished and then locking the collar against displacement relative to the journal portion until the seal has been assembled in the selected seal slot.

References Cited

UNITED STATES PATENTS

| | | | |
|---|---|---|---|
| 3,158,923 | 12/1964 | Reinsma | 29—149.5 |
| 3,220,104 | 11/1965 | Puidokas et al. | 29—148.4 |
| 3,286,335 | 11/1966 | Di Pietra | 29—200X |
| 3,447,226 | 6/1969 | Davis | 29—235 |
| 3,451,727 | 6/1969 | Deli et al. | 29—148.3X |

THOMAS H. EAGER, Primary Examiner

U.S. Cl. X.R.

29—148.4, 149.5, 450